United States Patent
Dubodelov et al.

(10) Patent No.: US 10,587,618 B2
(45) Date of Patent: Mar. 10, 2020

(54) DUAL BINDING

(71) Applicant: Microsoft Technology Licensing, LLC, Redmond, WA (US)

(72) Inventors: Vyacheslav Dubodelov, Redwood, CA (US); Fred Cheng, San Jose, CA (US); Justin Kominar, Monte Sereno, CA (US); Kunal Kandekar, Jersey City, NJ (US); Adam Trachtenberg, Mountain View, CA (US); Rahul Bansal, Mountain View, CA (US); Vaibhav Khandelwal, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 15/812,509

(22) Filed: Nov. 14, 2017

(65) Prior Publication Data
US 2019/0149547 A1    May 16, 2019

(51) Int. Cl.
*H04L 29/06* (2006.01)
*G06F 3/0484* (2013.01)
*H04W 12/08* (2009.01)

(52) U.S. Cl.
CPC .......... *H04L 63/10* (2013.01); *G06F 3/04842* (2013.01); *H04L 63/08* (2013.01); *H04W 12/0802* (2019.01)

(58) Field of Classification Search
CPC ..... H04L 63/08; H04L 63/0815; H04L 63/10; H04W 12/0802; G06F 17/60; G06F 3/04842
See application file for complete search history.

(56) References Cited

U.S. PATENT DOCUMENTS

| | | | | |
|---|---|---|---|---|
| 2003/0130867 A1* | 7/2003 | Coelho | ............... | G06F 19/3418 705/2 |
| 2003/0200465 A1* | 10/2003 | Bhat | ................... | H04L 63/0815 726/8 |
| 2007/0101145 A1* | 5/2007 | Sachdeva | ............ | H04L 63/0815 713/176 |
| 2012/0331567 A1* | 12/2012 | Shelton | ............... | G06F 21/6245 726/28 |

(Continued)

*Primary Examiner* — Daniel B Potratz
*Assistant Examiner* — Vu V Tran
(74) *Attorney, Agent, or Firm* — Schwegman Lundberg & Woessner, P.A.

(57) ABSTRACT

In an example, an action is received in a user interface that necessitates access of data, corresponding to the user, stored by a second network entity distinct from, a first network entity. A combined consent screen is then displayed, the combined consent screen including a button which, when activated in the user interface, authorizes data corresponding to the user to be exchanged in both directions between the first network entity and the second network entity. In response to the receiving of the indication that the button has been activated, a first access grant is generated at the first network entity and sent to the second network entity. An exchange of authorization code is received from the second network entity. A first access token corresponding to the first access grant is generated and sent to the second network entity. A second access token corresponding to a second access grant is received.

20 Claims, 13 Drawing Sheets

(56) References Cited

U.S. PATENT DOCUMENTS

| | | | |
|---|---|---|---|
| 2016/0134932 A1* | 5/2016 | Karp | H04W 4/80 |
| | | | 348/155 |
| 2016/0300220 A1* | 10/2016 | Sethi | G06Q 20/10 |
| 2018/0309759 A1* | 10/2018 | Leibmann | H04L 63/0815 |
| 2019/0097996 A1* | 3/2019 | Gong | H04L 63/0815 |

* cited by examiner

DUAL BINDING

TECHNICAL FIELD

The present disclosure generally relates to technical problems encountered in computer networks. More particularly, the present disclosure relates to binding user accounts across multiple computer networks.

BACKGROUND

Many computer users maintain multiple user accounts across many different computer service entities, such as email accounts, financial accounts, cloud storage accounts, ecommerce accounts, etc. The maintenance and use of user credentials, such as user names and passwords, across so many accounts can be daunting. Single Sign-On services allow users to maintain a single user name/password combination that can be used to access multiple different accounts across multiple entities, but such services do not permit the entities to communicate confidential user information among themselves. For example, a social networking service may partner with a corporate email provider. Single sign on allows the user to access both the social networking service and the corporate email provider using a single user name/password (or other credential) combination, but this does not allow the social networking service to obtain details about the user from the corporate email provider or vice versa. In addition to the privacy issues that would need to be resolved prior to permitting such access, there are technical challenges involved in doing so, especially if such information exchange is going to be bidirectionally initiated (i.e., where each of the providers has the ability to access data from the other) in a seamless manner.

Typically, such sharing of personal data requires user consent via an explicit user agreement and compliance controls. However, there currently exists a mechanism to perform this consent in only one direction at a time. For example, after logging into a social networking service, the user can grant permission to a corporate email provider to access social networking data from the social networking service, but the user would then have to separately log in to the corporate email provider and separately grant permission to the social networking service to access user information (such as contact information) from the corporate email provider.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, dual binding of user account identities across multiple network entities is accomplished through various mechanisms. Each entity keeps its own record of access grants, and a synchronization component is utilized to synchronize these records across the multiple entities. When a new access grant is requested by a user at a first entity, a consent flow is requested from the second entity. When this consent flow is then received and executed by the first entity, the user is presented with the opportunity to grant the consent to share information. Notably, this consent is a consent to share in both directions, e.g., from the first entity to the second entity and from the second entity to the first entity. Once this consent is granted, the entities are bound at the user identity level, creating, at each entity, an access grant which stores a record of the user's consent, an access token corresponding to the access grant on the other entity, and a refresh token corresponding to the access grant on the other entity. These tokens permit the access grant to be utilized by the other entity until it is revoked.

Figure 1:
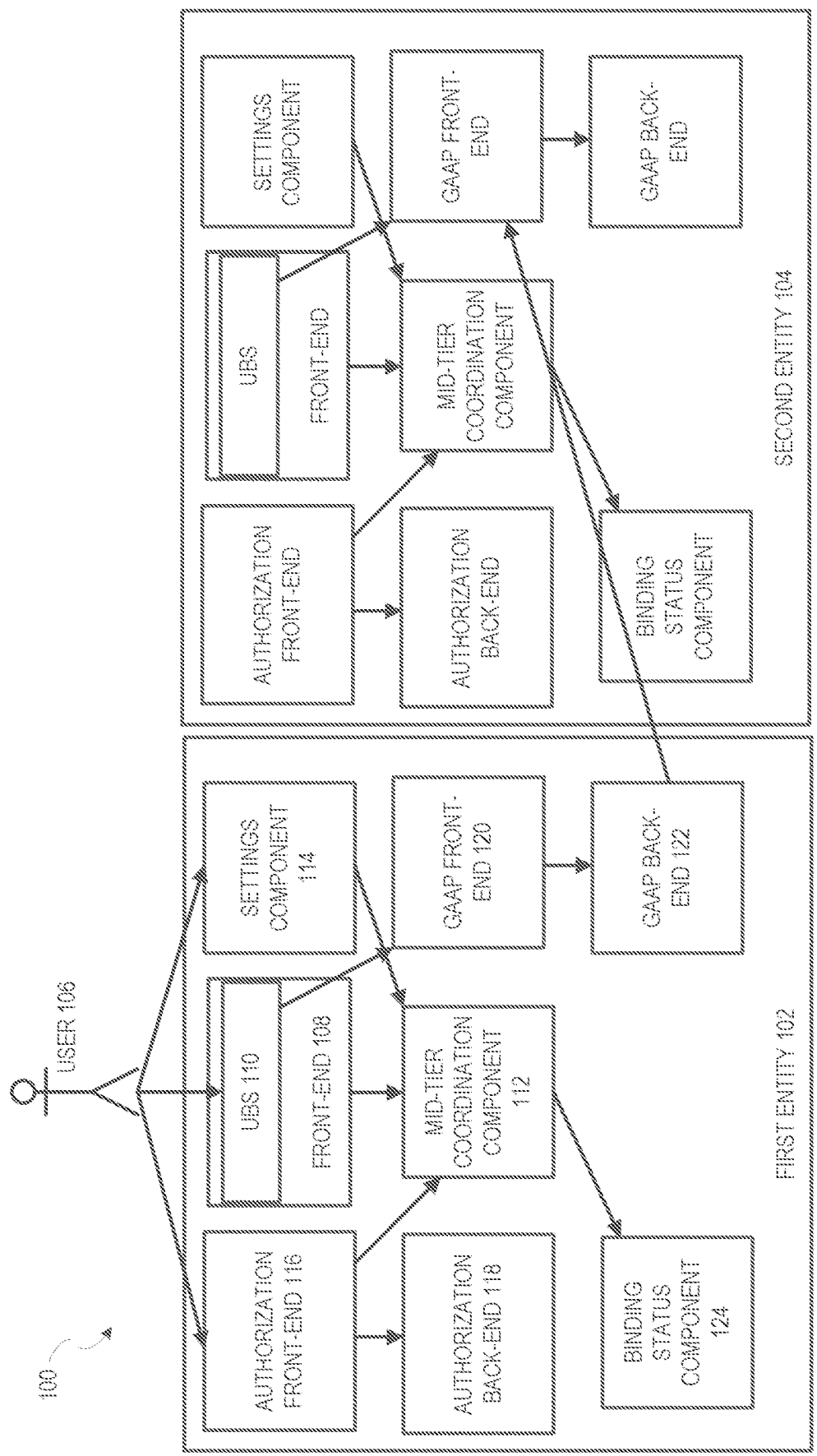
FIG. 1 is a block diagram illustrating a dual binding system in accordance with an example embodiment.

FIG. 1 is a block diagram illustrating a dual binding system 100 in accordance with an example embodiment. The dual binding system 100 may include a first entity 102 and a second entity 104. Each of these entities 102, 104 may comprise a service provided by a different real-world entity, such as a different company or organization. In this system 100, the first entity 102 and second entity 104 are each depicted as containing the same or similar functionality with regards to the dual binding system 100. In some example embodiments, the functionality may differ for the different entities. For example, in some example embodiments, the second entity 104 may lack the ability to permit users to initiate the binding, and thus the second entity 104 may lack some of the components and/or functionality described herein with respect to the initiation of the binding.

The user 106 is depicted as part of the system 100. Here, the user 106 is interacting directly with the first entity 102 as opposed to the second entity 104, although nothing would prevent the user 106 from additionally or alternatively interacting directly with the second entity 104.

The user 106 may initiate an authorization flow at the first entity 102 by interacting with a front-end 108 in the first entity 102. The front-end 108 may be, for example, a web site or an application server that causes interaction with the user 106 via a client component located on a client device operated by the user 106. For example, the user 106 may be operating a laptop computer with a web browser. In that case, the front-end 108 may be a web server containing web pages that can be served to the web browser for execution and rendering. In another example, the user 106 may be operating a mobile device with a stand-alone application corresponding to the first entity 102 (such as an "app" distributed by the first entity 102). In that case, the front-end 108 may be an application server containing scripts or other processes that can be served to the stand-alone application for execution and rendering.

In an example embodiment, the front-end 108 include a user binding system (UBS) 110. The UBS 110 may comprise libraries, plugins, and/or filters that encapsulate common behavior practiced by services of the first entity 102 that utilize data of the second entity 104. For example, the UBS 110 may contain a "bind your account with the second entity" button that can be incorporated into web pages and, when activated by a user, cause the authorization flow to be executed.

The UBS 110 communicates with a mid-tier coordination component 112, which coordinates backend calls to various components in the first entity 102. It exposes endpoints for the second entity 104 to call to complete the dual bind flow and for setting data opt-out changes, as well as for revocation.

Specifically, the user 106 may interact with a settings component 114, which acts as a front-end to allow the user 106 to configure settings for the binding, including, for example, the ability to control which individual applications on the second entity 104 can access the first entity 102 (and vice-versa), as well as individual data types that can be accessed. The mid-tier coordination component 112 may then interact with the settings component 114 to obtain and enforce these settings.

Additionally, the mid-tier coordination component 112 may interact with an authorization front-end 116 and authorization back-end 118 to obtain the actual access grant. The authorization front-end 116 is the service that shows an authorization screen and hosts an access token exchange. The authorization front-end 116 provides a dual bind flow, which takes in the combined scope when the authorization starts and returns the combined scope as part of the access token response. The authorization back-end 118 is a backend service that creates and stores authorization codes and access tokens. For dual bind embodiments, it also generates a refresh token to send to the second entity 104.

A gateway-as-a-platform (GAAP) front end 120 redirects users to third-party authorization screens and handles authorization responses by handling the authorization code redirect operation. In a dual binding environment, it calls the mid-tier coordination component 112 when a dual bind is being performed.

A GAAP back end 122 makes outgoing application program interface (API) calls to third parties (driven by scripts), handles third-party authorizations, and stores access information for third parties. API call definitions can be used to contact the second entity 104. As will be seen, authorization integration pieces on the second entity 104 may send and return new parameters, such as an encrypted member identification and an authorized scope.

A binding status component 124 is responsible for keeping track of the binding status of users of the first entity 102. The binding status component 124 is also responsible for providing metadata about the binding status for a given member and application and firing events when the binding status has changed.

As described briefly above, the second entity 104 may contain similar components as the first entity 102. This is depicted in this figure, although the individual components are not called out as they have already been described with respect to the first entity 102.

In embodiments where the components (and/or their underlying functionality) of the first entity 102 are not the same as the components (and/or their underlying functionality) of the second entity 104, the flow of establishing the dual binding may change depending upon whether the user 106 begins the authorization flow on the first entity 102 or the second entity 104.

Figure 2:
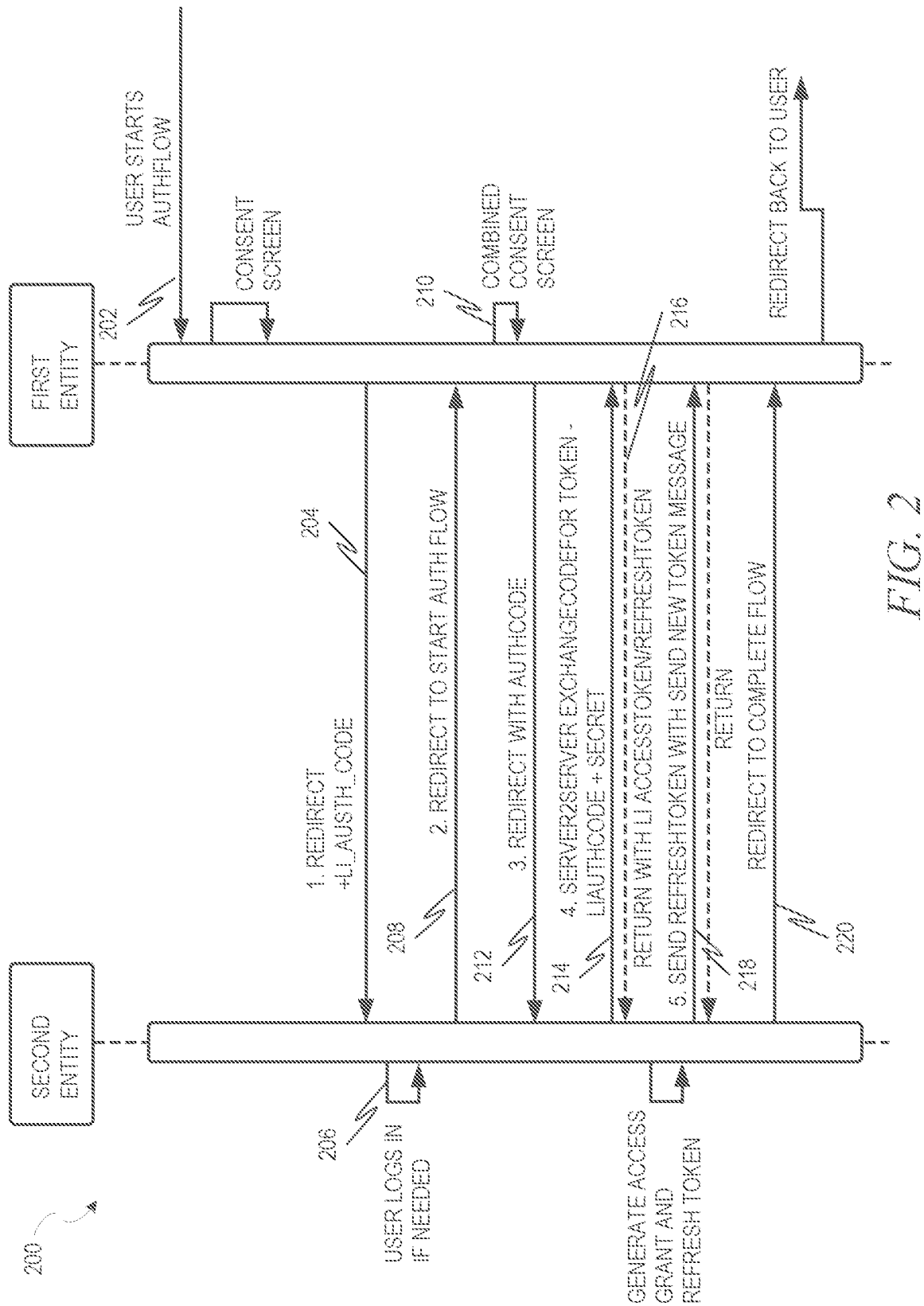
FIG. 2 is a ladder diagram illustrating a sequence of establishing dual binding when a user begins authorization flow on a first entity, in accordance with an example embodiment.

FIG. 2 is a ladder diagram illustrating a sequence 200 of establishing dual binding when a user 106 begins authorization flow on a first entity 102, in accordance with an example embodiment. At operation 202, the user 106 begins the authorization flow. At operation 204, a redirect is made to authorization code on the second entity 104. In an example embodiment, this may look like an OAuth 2.0 authorization request, passing along a client identification, scope, state, and redirect uniform resource identifier (URI). At operation 206, the second entity 104 may prompt the user 106 to log in, if needed. Control is then passed back to the first entity 102 at operation 208. At operation 210, a combined consent screen is presented to the user 106. Assuming the user 106 consents, at operation 212, a redirect is made to the second entity 104 with an access grant from the first entity 102. At operation 214, a server-to-server exchange occurs where the second entity 104 uses the access grant provided in operation 212 to request an access token. In an example embodiment, this server-to-server exchange is performed via the OAuth 2.0 protocol. This may include a grant type, code, redirect URI (the same URI that was obtained earlier), and an external identity key, which is a unique value for a user. At operation 216, the first entity 102 returns an access token and refresh token to the second entity 104. Also passed in operation 216 may be a scope (the same scope as was received earlier), and an encrypted member identification. An access token is a token that may be used to access data on the first entity, while a refresh token is a token that may be used to obtain a replacement access token if the access token expires or otherwise fails.

At operation 218 the second entity 104 generates its own access grant and access and refresh tokens, and at operation 220, the second entity 104 sends this access token and refresh token to the first entity 102.

Figure 3:
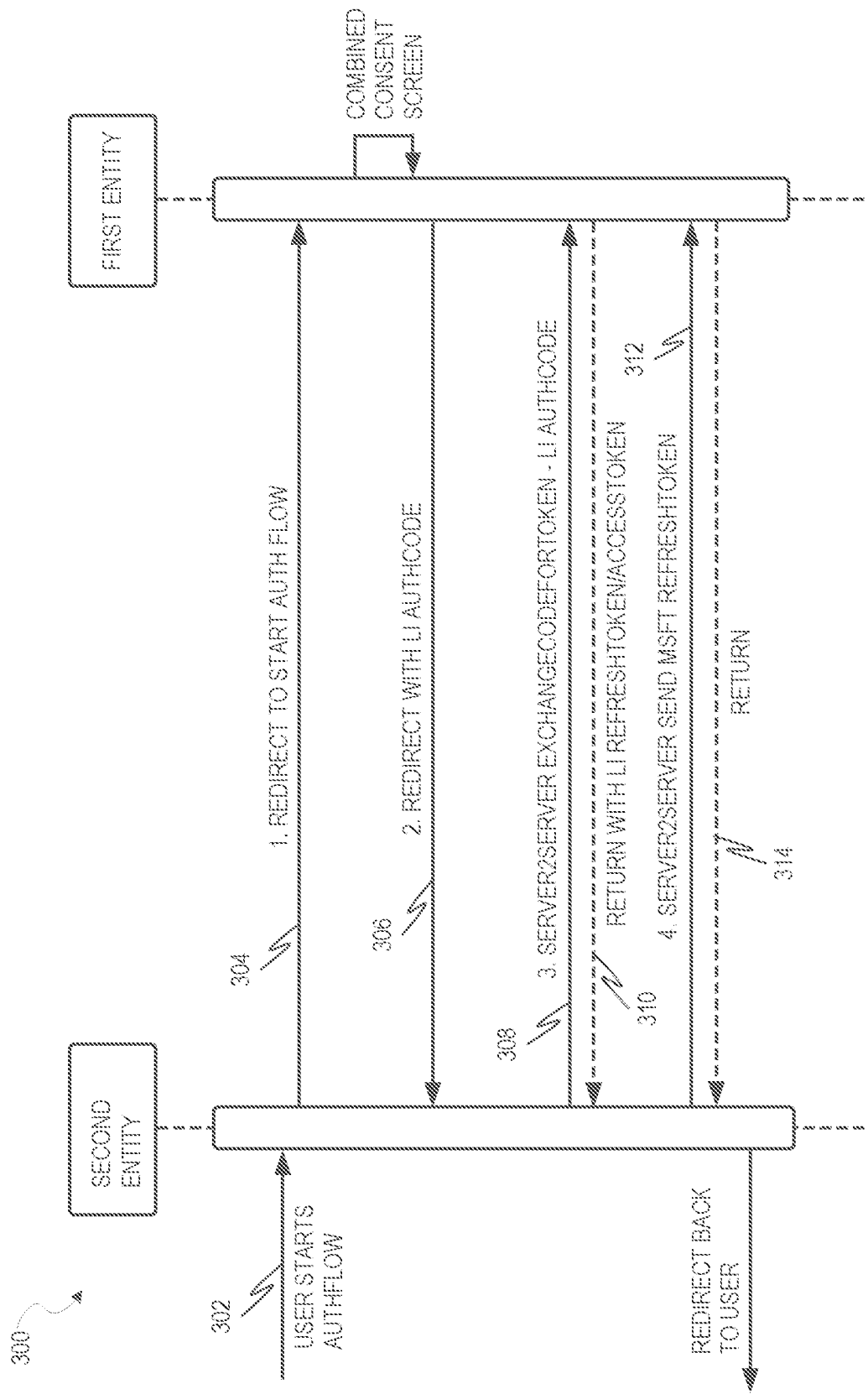
FIG. 3 is a ladder diagram illustrating a sequence of establishing dual binding when a user begins authorization flow on a second entity, in accordance with an example embodiment.

FIG. 3 is a ladder diagram illustrating a sequence 300 of establishing dual binding when a user 106 begins authorization flow on a second entity 104, in accordance with an example embodiment. At operation 302, the user 106 begins the authorization flow. At operation 304, a redirect is made to start the authorization flow on the first entity 102. At operation 306, a combined consent screen is presented to the user 106. Assuming the user 106 consents, at operation 308, a redirect is made to the first entity 102 with an access grant from the second entity 104. At operation 310, a server-to-server exchange occurs where the second entity 104 uses the access grant provided in operation 308 to request an access token. In an example embodiment, this server-to-server exchange is performed via the OAuth 2.0 protocol. This may include a grant type, code, redirect URI (the same URI that was obtained earlier), and an external identity key, which is a unique value for a user. At operation 312, the first entity 102 returns an access token and refresh token to the second entity 104. Also passed in operation 312 may be a scope (the same scope as was received earlier), and an encrypted member identification.

At operation 314 the second entity 104 generates its own access grant and access and refresh tokens, and at operation 316 the second entity 104 sends this access token and refresh token to the first entity 102.

Once the dual binding is established, each entity 102, 104 can use the access token and/or refresh token to request data for the user 106 from the other entity 102, 104, without needing explicit action from the user 106. For example, the first entity 102 can send a request for information along with the access token to the second entity 104, which can then check the access token against its access grants and, if the access token matches an access grant, permit access to the data. The same process can be followed if the second entity 104 wishes to access data from the first entity 102.

Figure 4:
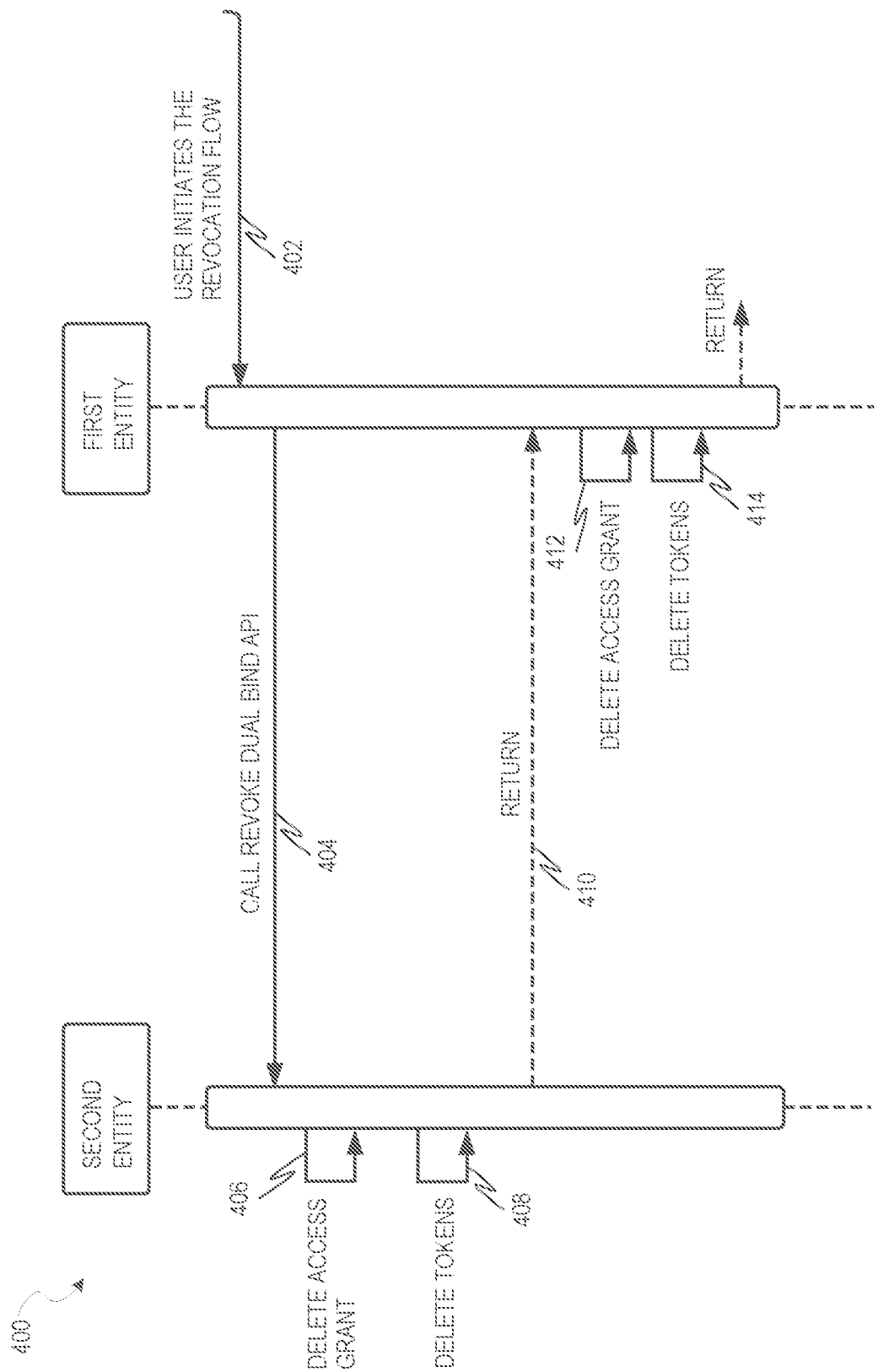
FIG. 4 is a ladder diagram illustrating a sequence of revoking dual binding, in accordance with an example embodiment.

At some point, the user 106 may wish to revoke the access grant. FIG. 4 is a ladder diagram illustrating a sequence 400 of revoking dual binding, in accordance with an example embodiment. At operation 402, the user 106 initiates the revocation flow on the first entity 102. The first entity 102 can then call a revoke dual bind API at operation 404, which causes the second entity 104 to delete the corresponding access grant at operation 406 and delete the corresponding access and/or refresh tokens at operation 408. At operation 410, control is returned to the first entity 102, which, at operation 412, deletes the corresponding access grant and at operation 414 deletes the corresponding access and/or refresh tokens.

Figure 5:
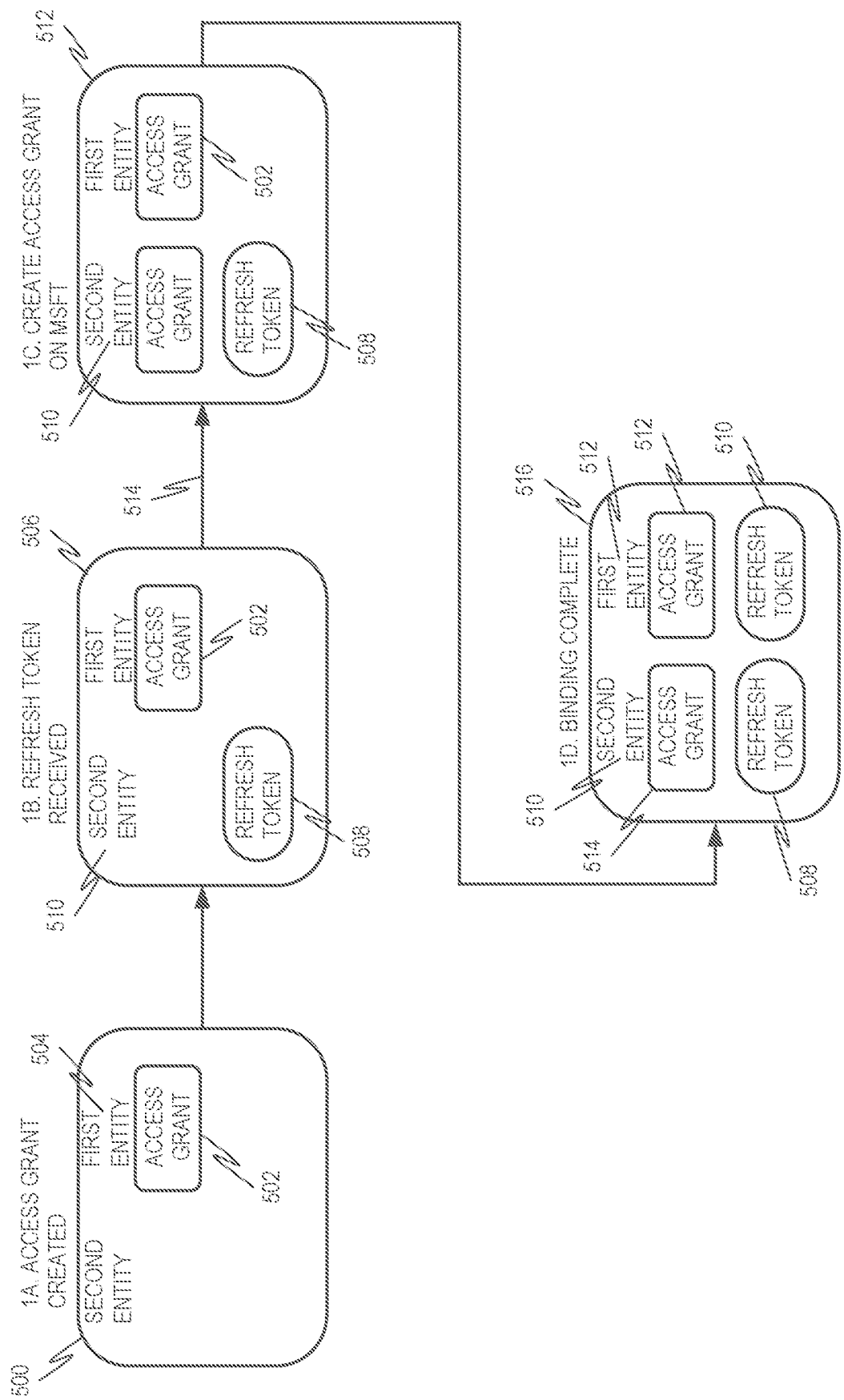
FIG. 5 is a diagram illustrating how a data model state changes when dual binding is performed, in accordance with an example embodiment.

FIG. 5 is a diagram illustrating how a data model state changes when dual binding is performed in accordance with an example embodiment. A first data model state 500 exists when an access grant 502 is first created on the first entity 504. A second data model state 506 exists when the refresh token 508 is created on the second entity 510. A third data model state 512 exists when an access grant 514 is first created on the second entity 510. A fourth data model state 516 exists when a refresh token 508 is created on the first entity 504.

Figure 6:
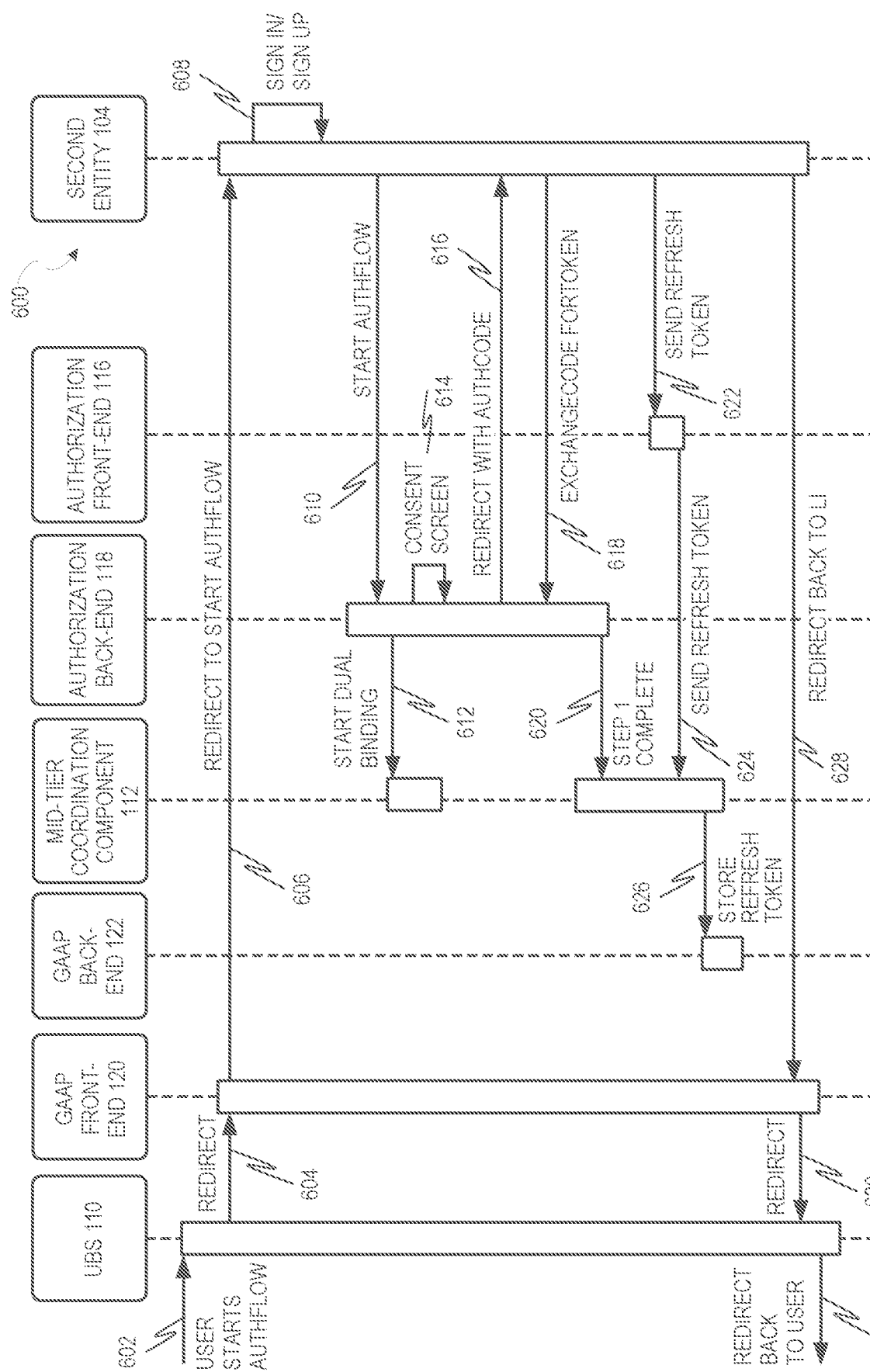
FIG. 6 is a ladder diagram illustrating a sequence among components of a first entity when a user initiates an authorization flow at the first entity, in accordance with an example embodiment.

FIG. 6 is a ladder diagram illustrating a sequence 600 among components of a first entity 102 when a user 106 initiates an authorization flow at the first entity 102, in accordance with an example embodiment. At operation 602, the user 106 initiates the authorization flow to the UBS 110. At operation 604, the UBS 110 redirects to the GAAP front end 120. At operation 606, the GAAP front end 120 redirects to the second entity 104 to start the authorization flow. At operation 608, the second entity 104 presents a sign-in or sign-up screen to the user 106 which the user 106 completes. At operation 610, the second entity 104 begins the authorization flow at the authorization back end 118 of the first entity 102. At operation 612, the authorization back end 118 begins the dual binding at the mid-tier coordination component 112. At operation 614, a dual consent screen is presented to the user 106, which the user 106 completes. At operation 616, the authorization back end 118 redirects with the authorization code to the second entity 104. At operation 618, the second entity 104 sends exchange code for a token to the authorization back end 118. At operation 620, the authorization back end 118 completes step 1 authorization at the mid-tier coordination component 112.

At operation 622, the second entity 104 sends a refresh token to the authorization front end 116. At operation 624, the authorization front end 116 sends the refresh token to the mid-tier coordination component 112, which, at operation 626, stores the refresh token at the GAAP back end 122.

At operation 628, the second entity 104 redirects back to the first entity 102, specifically the GAAP front end 120. At operation 630, the GAAP front end 120 redirects to the UBS 110. At operation 632, the UBS 110 redirects back to the user 106.

Figure 7:
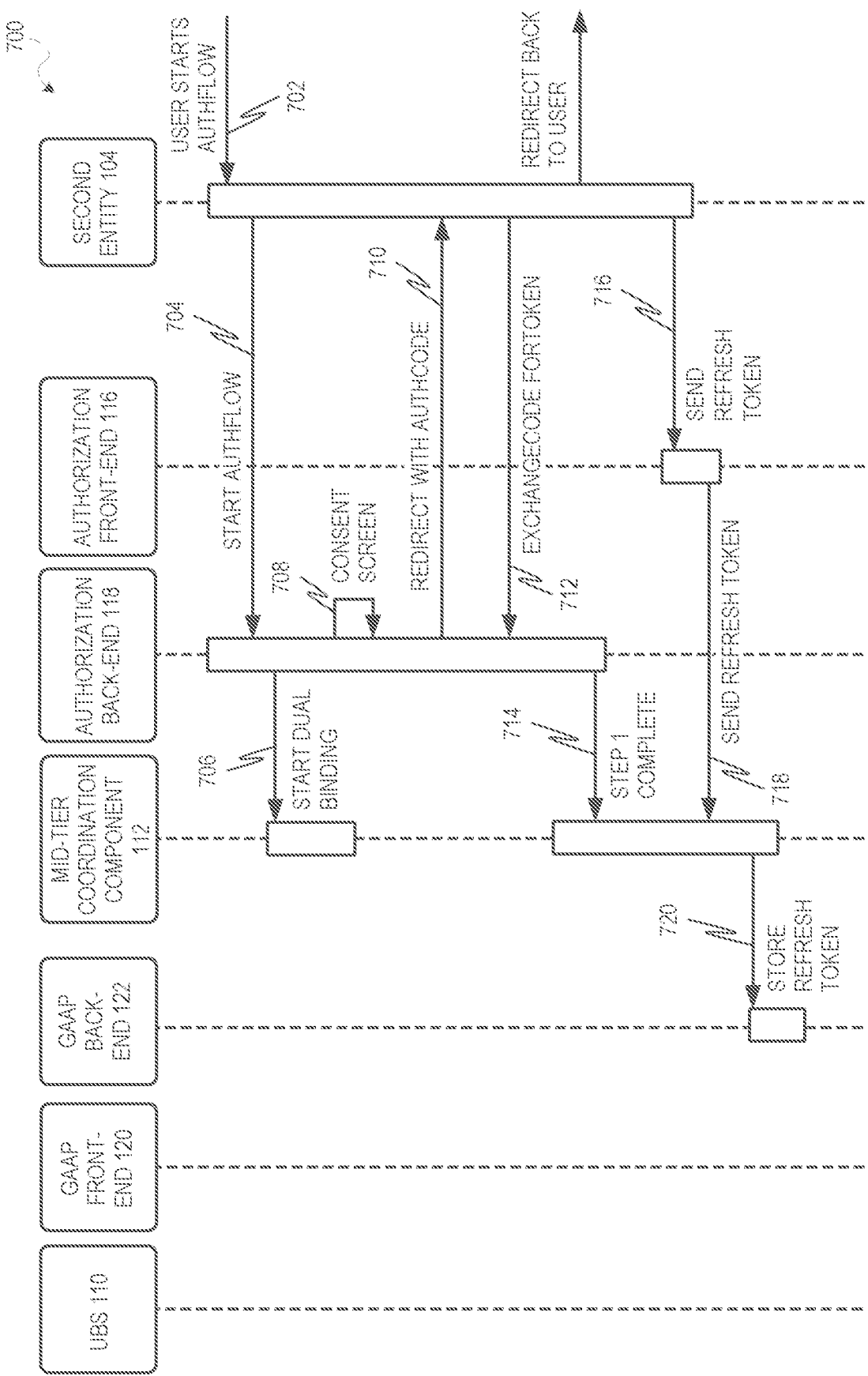
FIG. 7 is a ladder diagram illustrating a sequence among components of a first entity when a user initiates an authorization flow at a second entity, in accordance with an example embodiment.

FIG. 7 is a ladder diagram illustrating a sequence 700 among components of a first entity 102 when a user 106 initiates an authorization flow at a second entity 104, in accordance with an example embodiment. At operation 702, the user 106 initiates the authorization flow. At operation 704, the second entity 104 begins the authorization flow at the authorization back end 118 of the first entity 102. At operation 706, the authorization back end 118 begins the dual binding at the mid-tier coordination component 112. At operation 708, a dual consent screen is presented to the user 106, which the user 106 completes. At operation 710, the authorization back end 118 redirects with the authorization code to the second entity 104. At operation 712, the second entity 104 sends exchange code for a token to the authorization back end 118. At operation 714, the authorization back end 118 completes step 1 authorization at the mid-tier coordination component 112.

At operation 716, the second entity 104 sends a refresh token to the authorization front end 116. At operation 718, the authorization front end 116 sends the refresh token to the mid-tier coordination component 112, which at operation 720 stores the refresh token at the GAAP back end 122.

Figure 8:
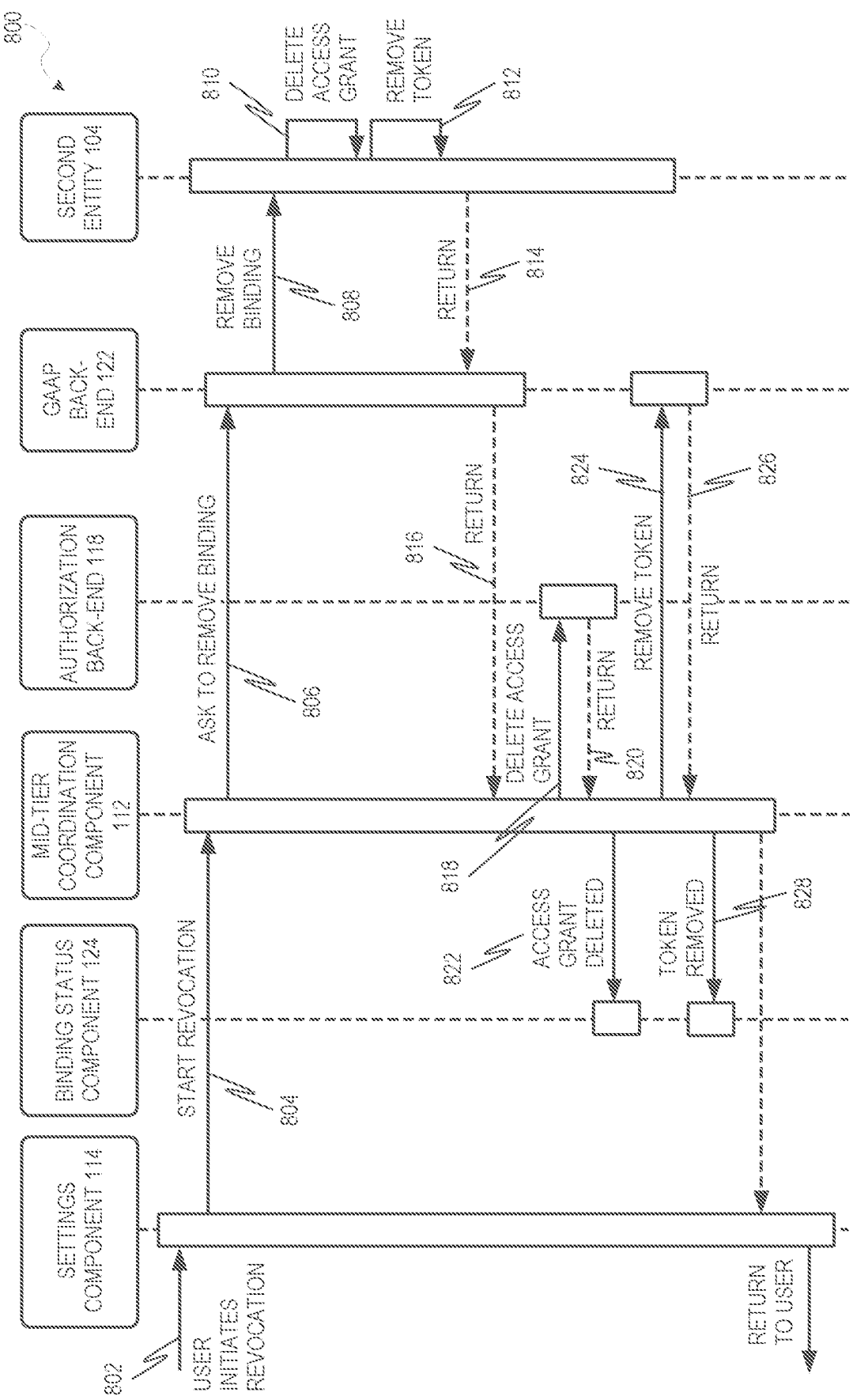
FIG. 8 is a ladder diagram illustrating a sequence among components of a first entity when a user initiates a binding revocation at the first entity, in accordance with an example embodiment.

FIG. 8 is a ladder diagram illustrating a sequence 800 among components of a first entity 102 when a user 106 initiates a binding revocation at the first entity 102, in accordance with an example embodiment. At operation 802, the user 106 initiates a revocation at the settings component 114. At operation 804, the settings component 114 tells the mid-tier coordination component 112 to start the revocation process. At operation 806, the mid-tier coordination component 112 sends a request for the second entity 104 to remove the binding to the GAAP back-end 122, which, at operation 808, communicates this request to the second entity 104.

At operation 810, the second entity 104 deletes its access grant corresponding to this user 106, and at operation 812, the second entity 104 removes the token corresponding to this access grant. At operation 814, the second entity 104 returns control to the GAAP back end 122.

At operation 816, the GAAP back end 122 returns control to the mid-tier coordination component 112. At operation 818, the mid-tier coordination component 112 deletes its access grant corresponding to the user 106 at the authorization back end 118, which then returns control back to the mid-tier coordination component 112 at operation 820.

At operation 822, the mid-tier coordination component 112 informs the binding status component 124 that the access grant has been deleted. At operation 824, the mid-tier coordination component 112 removes the token corresponding to the first entity's 102 access grant corresponding to the user at the GAAP back end 122, which then returns control to the mud-tier coordination component 112 at operation 826.

At operation 828, the mid-tier coordination component 112 informs the binding status component 124 that the token has been removed.

Figure 9:
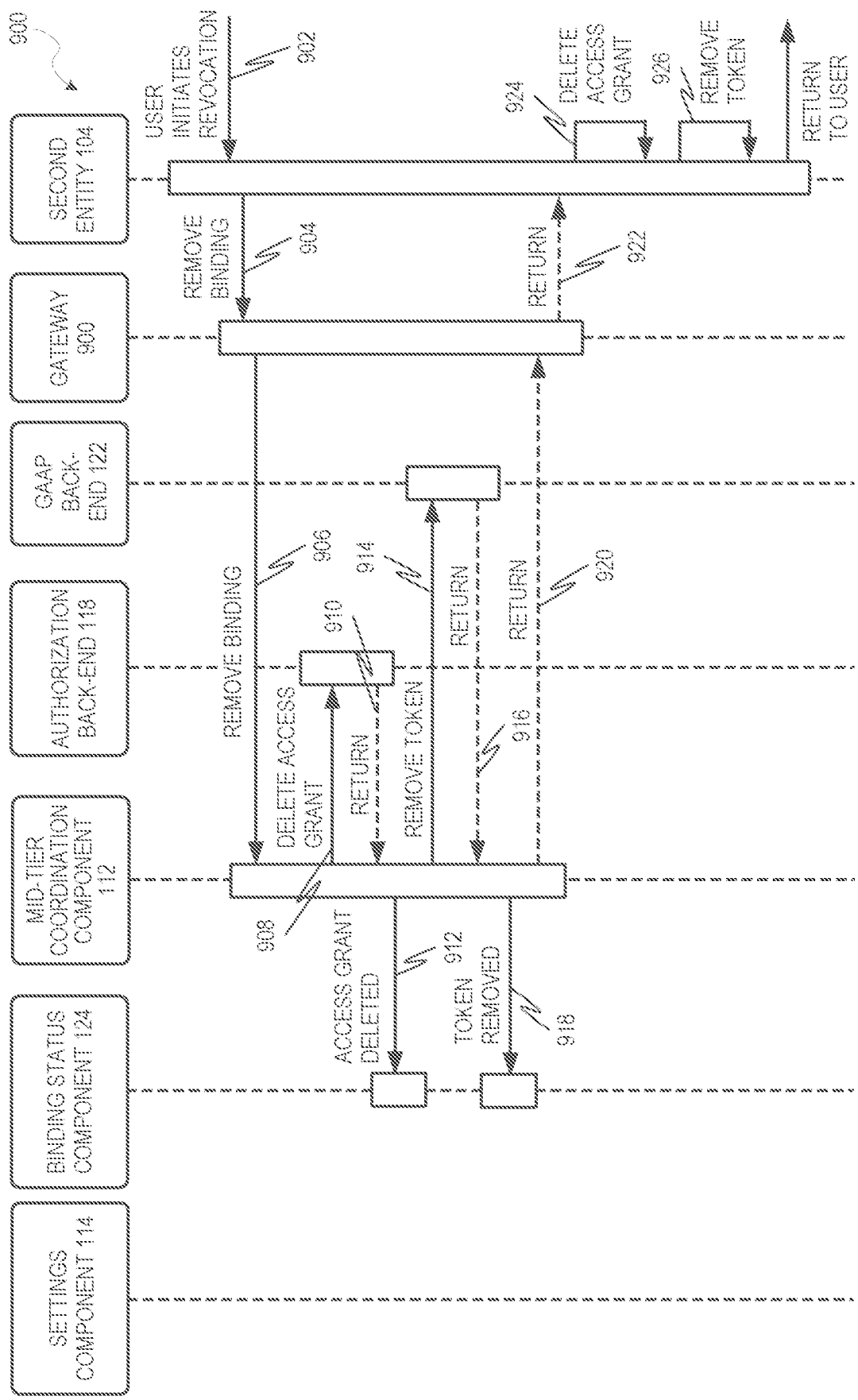
FIG. 9 is a ladder diagram illustrating a sequence among components of a first entity when a user initiates a binding revocation at a second entity, in accordance with an example embodiment.

FIG. 9 is a ladder diagram illustrating a sequence among components of a first entity 102 when a user 106 initiates a binding revocation at a second entity 104, in accordance with an example embodiment. At operation 902, the user 106 initiates revocation at the second entity 104. At operation 904, the second entity 104 instructs a gateway 900 to remove the binding. At operation 906, the gateway 900 requests the mid-tier coordination component 112 to start the revocation process. At operation 908, the mid-tier coordination component 112 deletes the first entity's 102 access grant corresponding to the user 106 at the authorization back-end 118, which then returns control back to the mid-tier coordination component 112 at operation 910.

At operation 912, the mid-tier coordination component 112 informs the binding status component 124 that the access grant has been deleted. At operation 914, the mid-tier coordination component 112 removes the token corresponding to the first entity's 102 access grant corresponding to the user 106 at the GAAP back-end 122, which then returns control to the mid-tier coordination component 112 at operation 916.

At operation 918, the mid-tier coordination component 112 informs the binding status component 124 that the token has been removed. At operation 920, control is returned to the gateway 900, which at operation 922 returns control to the second entity 104.

At operation 924, the second entity 104 deletes its access grant corresponding to the user 106, and at operation 926 the second entity 104 removes the token corresponding to that access grant.

Figure 10:
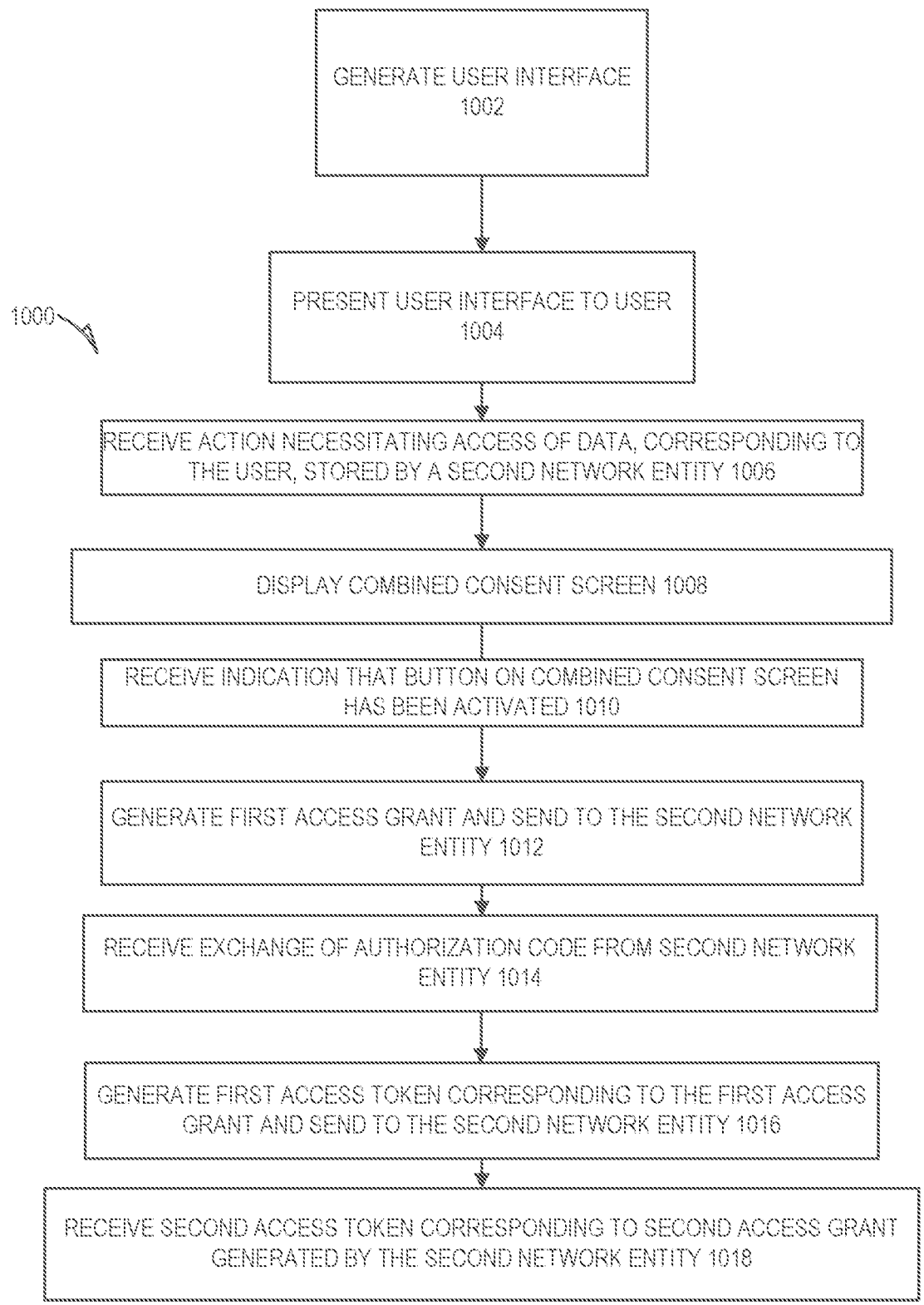
FIG. 10 is a flow diagram illustrating a method for dual binding in accordance with an example embodiment.

FIG. 10 is a flow diagram illustrating a method 1000 for dual binding in accordance with an example embodiment. At operation 1002, a user interface is generated at a first network entity. At operation 1004, the user interface is presented to the user. At operation 1006, an action that necessitates access of data, corresponding to the user, stored by a second network entity, is received via the user interface. At operation 1008, a combined consent screen is displayed in the user interlace, the combined consent screen including a button which, when activated in the user interface, authorizes data corresponding to the user to be exchanged in both directions between the first network entity and the second network entity. At operation 1010, an indication that the button has been activated is received. At operation 1012, in response to the receiving of the indication that the button has been activated, a first access grant is generated at the first network entity and sent to the second network entity. At operation 1014, an exchange of authorization code is received from the second network entity. At operation 1016, a first access token corresponding to the first access grant is generated and sent to the second network entity. At operation 1018, a second access token corresponding to a second access grant generated by the second network entity is received from the second network entity.

Figure 11:
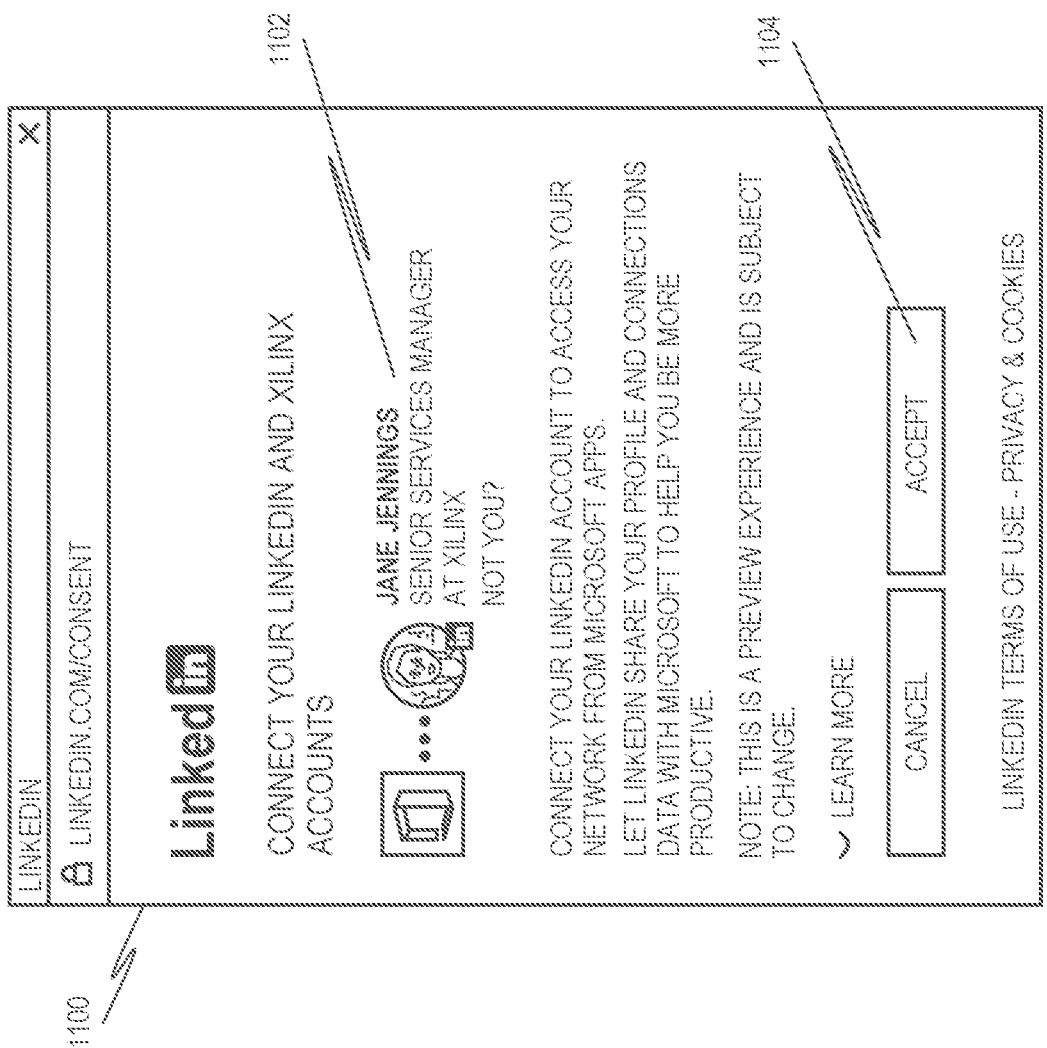
FIG. 11 is a screen capture illustrating a user interface screen in which a combined consent screen is displayed.

FIG. 11 is a screen capture illustrating a user interface screen 1100 in which a combined consent screen is displayed. As can be seen, the user interface screen 1100 includes an area 1102 where the combined consent aspects are described to the user, as well as a button 1104 which the user can select to accept the combined consent.

Figure 12:
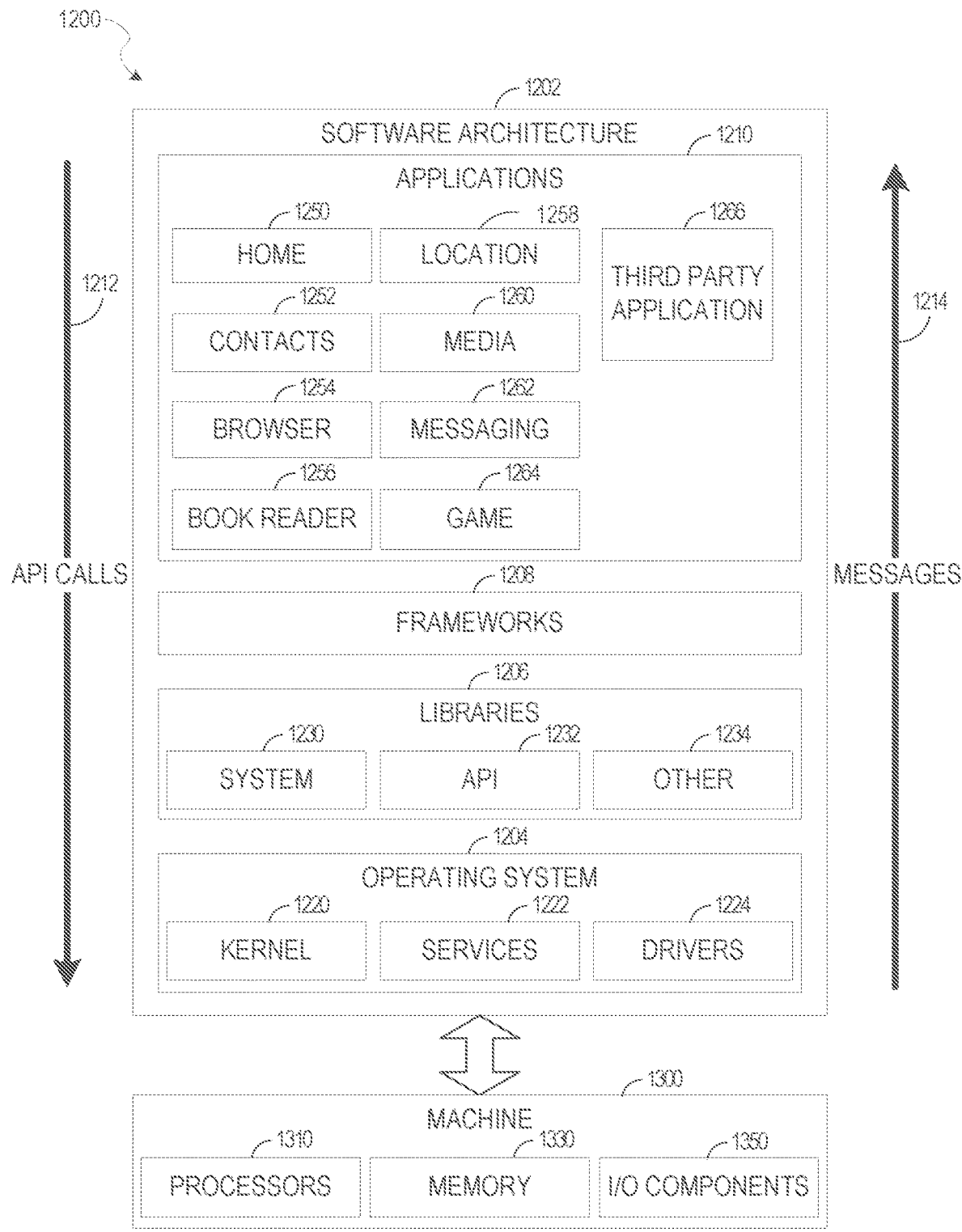
FIG. 12 is a block diagram illustrating an architecture of software, which can be installed on any one or more of the devices described above, according to an example embodiment.

FIG. 12 is a block diagram 1200 illustrating an architecture of software 1202, which can be installed on any one or more of the devices described above. FIG. 12 is merely a non-limiting example of a software architecture, and it will be appreciated that many other architectures can be implemented to facilitate the functionality described herein. In various embodiments, the software 1202 is implemented by hardware such as a machine 1300 of FIG. 13 that includes processors 1310, memory 1330, and input/output (I/O) components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke API calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services far the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1266 can invoke the API calls 1212 provided by the operating system 1204 to facilitate functionality described herein.

Figure 13:
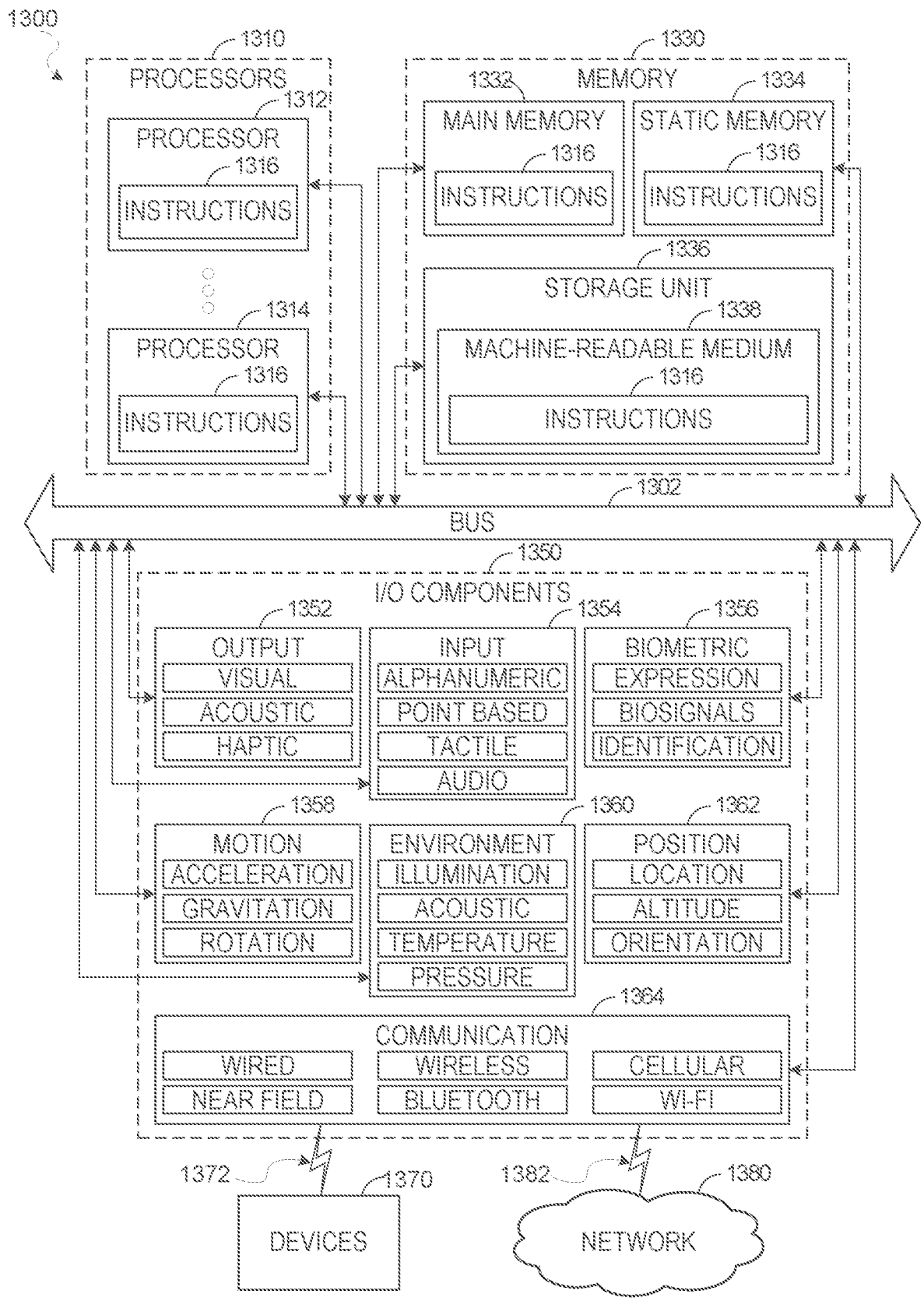
FIG. 13 illustrates a diagrammatic representation of a machine in the form of a computer system within which a set of instructions may be executed for causing the machine to perform any one or more of the methodologies discussed herein, according to an example embodiment.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the method 1000 of FIG. 10. Additionally, or alternatively, the instructions 1316 may implement FIGS. 1-10, and so forth. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network route, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an application-specific integrated circuit (ASIC), a Radio-Frequency Integrated Circuit (RFIC), another processor, or any suitable combination thereof) may include, for example, a processor 1312 and a processor 1314 that may execute the instructions 1316. The term "processor" is intended to include multi-core processors that may comprise two or more independent processors (sometimes referred to as "cores") that may execute instructions contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a Global Positioning System ((GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1330, 1332, 1334, and/or memory of the processor(s) 1310) and/or the storage unit 1336 may store one or more sets of instructions and data structures (e.g., software) embodying or utilized by any one or more of the methodologies or functions described herein. These instructions (e.g., the instructions 1316), when executed by the processors) 1310, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1380 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., HTTP). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a memory; and
a computer-readable medium having instructions stored thereon, which, when executed by a processor, cause the system to:
generate, at a first computer network entity, a user interface;
cause a presentation of the user interface to a user;
receive, via the user interface, an action that necessitates access of data, corresponding to the user, stored by a second computer network entity distinct from the first computer network entity;
cause display in the user interface of a combined consent screen, the combined consent screen including a button which, when activated in the user interface, authorizes private user data corresponding to the user to be exchanged in both directions between the first computer network entity and the second computer network entity;
receive an indication that the button has been activated; and
in response to the receiving of the indication that the button has been activated:
generate a first access grant at the first computer network entity and send the first access grant to the second computer network entity;
receive an exchange of authorization code from the second computer network entity;
generate a first access token corresponding to the first access grant and send the first access token to the second computer network entity; and
receive, from the second network entity, a second access token corresponding to a second access grant generated by the second computer network entity.

2. The system of claim 1, wherein the instructions further cause the system to:

in response to the receiving of the action, redirect to the second computer network entity where the user is requested to log in to the second computer network entity and, in response to the user logging in, redirect to the first computer network entity.

3. The system of claim 1, wherein the generating of the first access token and sending of the first access token further includes generating a first refresh token corresponding to the first access token and sending the first refresh token to the second computer network entity.

4. The system of claim 1, wherein the instructions further cause the system to:
receive, via the user interface, a request to revoke authorization of private user data corresponding to the user to be exchanged in both directions;
in response to the receiving of the request to revoke authorization, delete the first access grant and first access token and redirect to the second computer network entity to delete the second access grant and second access token.

5. The system of claim 1, wherein the first access grant is set to allow access only to one or more specified data types.

6. The system of claim 1, wherein the first access grant is set to allow access only to one or more specified applications.

7. The system of claim 1, wherein the instructions further cause the system to:
receive a data access request and the second access token from the second computer network entity; and
in response to the receiving of the data access request and the second access token:
compare the first access token to the first access grant to determine if the second computer network entity is authorized for access to data corresponding to the data access request; and
in response to a determination that second computer network entity is authorized for access to data corresponding to the data access request, obtain the data corresponding to the data access request and return the data corresponding to the data access request to the second computer network entity.

8. A computerized method comprising:
generating, at a first computer network entity, a user interface;
causing a presentation of the user interface to a user;
receiving, via the user interface, an action that necessitates access of data, corresponding to the user, stored by a second computer network entity distinct from the first computer network entity;
causing display in the user interface of a combined consent screen, the combined consent screen including a button which, when activated in the user interface, authorizes private user data corresponding to the user to be exchanged in both directions between the first computer network entity and the second computer network entity;
receiving an indication that the button has been activated;
in response to the receiving of the indication that the button has been activated:
generating a first access grant at the first computer network entity and sending the first access grant to the second computer network entity;
receiving an exchange of authorization code from the second computer network entity;
generating a first access token corresponding to the first access grant and sending the first access token to the second computer network entity; and receiving, from the second computer network entity, a second access token corresponding to a second access grant generated by the second computer network entity.

9. The method of claim 8, further comprising:
in response to the receiving of the action, redirecting to the second computer network entity where the user is requested to log in to the second computer network entity and, in response to the user logging in, redirecting to the first computer network entity.

10. The method of claim 8, wherein the generating of the first access token and sending of the first access token further includes generating a first refresh token corresponding to the first access token and sending the first refresh token to the second computer network entity.

11. The method of claim 8, further comprising:
receiving, via the user interface, a request to revoke authorization of private user data corresponding to the user to be exchanged in both directions; and
in response to the receiving of the request to revoke authorization, deleting the first access grant and first access token and redirecting to the second computer network entity to delete the second access grant and second access token.

12. The method of claim 8, wherein the first access grant is set to allow access only to one or more specified data types.

13. The method of claim 8, wherein the first access grant is set to allow access only to one or more specified applications.

14. The method of claim 8, further comprising:
receiving a data access request and the second access token from the second computer network entity; and
in response to the receiving of the data access request and the second access token
comparing the first access token to the first access grant to determine if the second computer network entity is authorized for access to data corresponding to the data access request; and
in response to a determination that second computer network entity is authorized for access to data corresponding to the data access request, obtaining the data corresponding to the data access request and returning the data corresponding to the data access request to the second computer network entity.

15. A non-transitory machine-readable storage medium comprising instructions, which when implemented by one or more machines, cause the one or more machines to perform operations comprising:
generating, at a first computer network entity, a user interface;
causing a presentation of the user interface to a user;
receiving, via the user interface, an action that necessitates access of data, corresponding to the user, stored by a second computer network entity distinct from the first computer network entity;
causing display in the user interface of a combined consent screen, the combined consent screen including a button which, when activated in the user interface, authorizes private user data corresponding to the user to be exchanged in both directions between the first computer network entity and the second computer network entity;
receiving an indication that the button has been activated;
in response to the receiving of the indication that the button has been activated:
generating a first access grant at the first computer network entity and sending the first access grant to the second computer network entity;
receiving an exchange of authorization code from the second computer network entity;
generating a first access token corresponding to the first access grant and sending the first access token to the second computer network entity; and
receiving, from the second computer network entity, a second access token corresponding to a second access grant generated by the second computer network entity.

16. The non-transitory machine-readable storage medium of claim 15, wherein the operations further comprise:
in response to the receiving of the action, redirecting to the second computer network entity where the user is requested to log in to the second computer network entity and, in response to the user logging in, redirecting to the first computer network entity.

17. The non-transitory machine-readable storage medium of claim 15, wherein the generating of the first access token and sending of the first access token further includes generating a first refresh token corresponding to the first access token and sending the first refresh token to the second computer network entity.

18. The non-transitory machine-readable storage medium of claim 15, wherein the operations further comprising:
receiving, via the user interface, a request to revoke authorization of private user data corresponding to the user to be exchanged in both directions; and
in response to the receiving of the request to revoke authorization, deleting the first access grant and first access token and redirecting to the second computer network entity to delete the second access grant and second access token.

19. The non-transitory machine-readable storage medium of claim 15, wherein the first access grant is set to allow access only to one or more specified data types.

20. The non-transitory machine-readable storage medium of claim 15, wherein the first access grant is set to allow access only to one or more specified applications.

* * * * *